June 6, 1967  R. J. NEWHOUSER  3,323,808
WORKPIECE CLAMPING MEANS
Filed Oct. 28, 1964  2 Sheets-Sheet 1
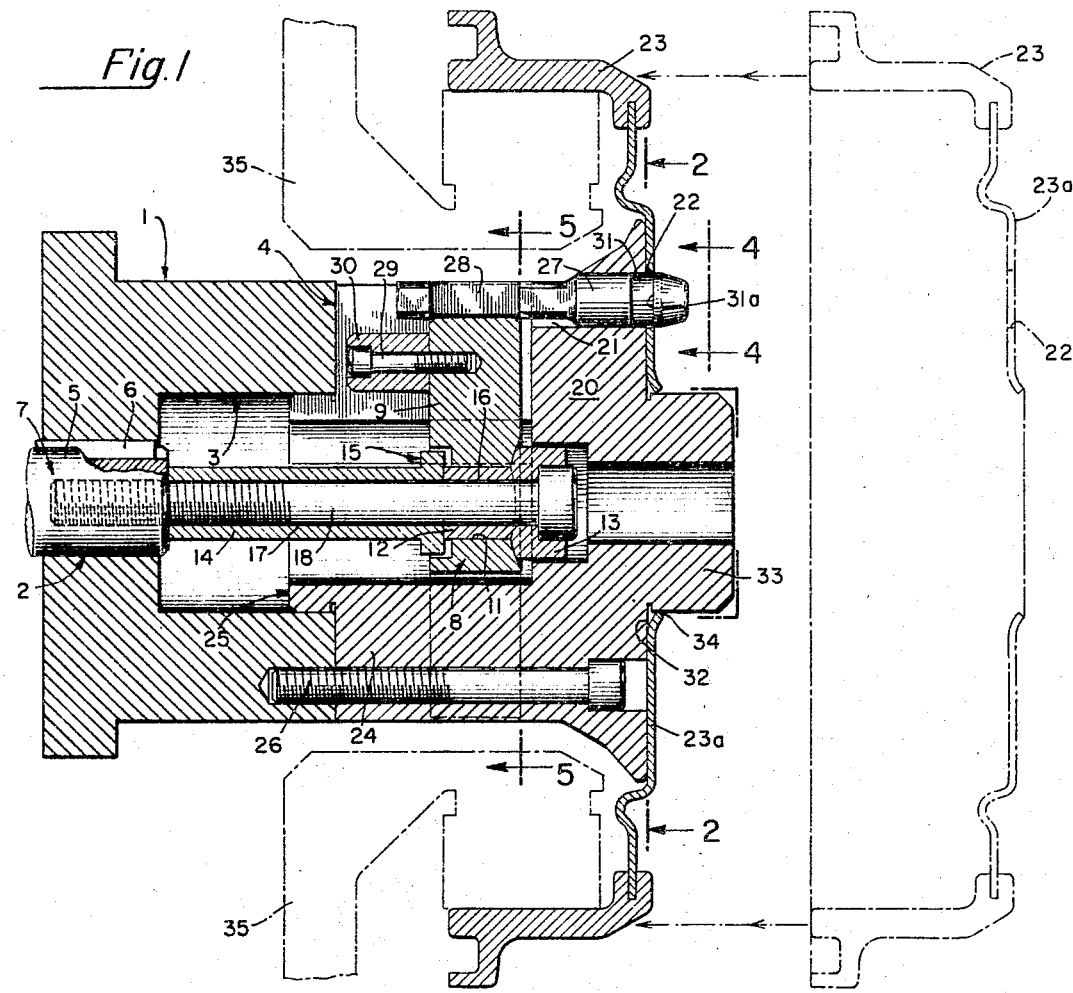
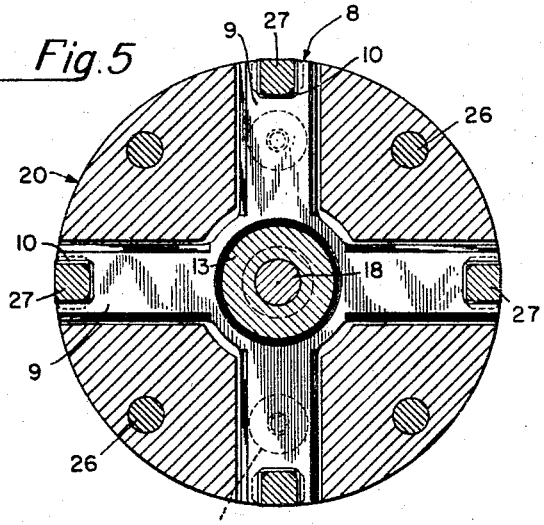
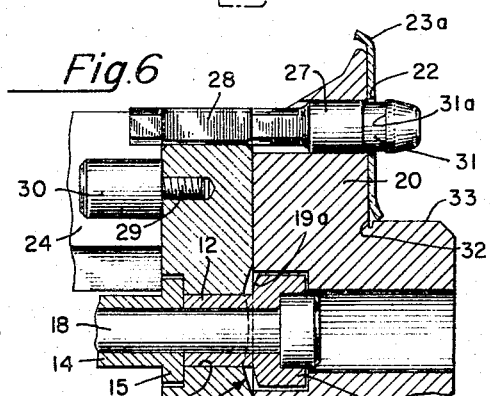
INVENTOR.
RICHARD J. NEWHOUSER
BY
John B Sowell
ATTORNEY June 6, 1967 R. J. NEWHOUSER 3,323,808
WORKPIECE CLAMPING MEANS
Filed Oct. 28, 1964 2 Sheets-Sheet 2

INVENTOR.
RICHARD J. NEWHOUSER
BY
John B. Sowell
ATTORNEY

United States Patent Office 3,323,808
Patented June 6, 1967

3,323,808
WORKPIECE CLAMPING MEANS
Richard J. Newhouser, Detroit, Mich., assignor to The Budd Company, Philadelphia, Pa., a corporation of Pennsylvania
Filed Oct. 28, 1964, Ser. No. 407,073
3 Claims. (Cl. 279—1)

This invention relates to a clamping device for use in machine tools, and, in particular, to a device for accurately locating and holding an article, such as, for example, a brake drum, in centered position during the performance of a machining operation.

In the machining of the braking surface of a brake drum, the conventional practice is to clamp the drum in position by means of a chuck which cooperates with the outer peripheral surfaces of the drum. The clamping device of the present construction departs from this conventional practice in that it is directed to cooperate with the stud holes in the head of the drum for effecting the clamping action.

The primary object of the present invention is to provide a clamping device of such construction as to permit easy and rapid loading and unloading of a brake drum with respect to a machine tool.

Another object is to provide a clamping device for machine tools which is comprised of relatively few parts.

A further object is to provide a clamping device for brake drums of relatively simple construction having slidable elongated elements which cooperate with the stud openings in the brake drum head to accurately center and hold the brake drum on a machine tool spindle during a machining operation.

With the above and other objects in view, the present invention comprises certain features of construction and combinations of parts to be hereinafter described with reference to the accompanying drawings, and then claimed.

In the accompanying drawings in which like numerals refer to like parts throughout the several views:

FIGURE 1 is longitudinal cross section of the clamping device taken on line 1—1 of FIGURE 2 and showing a brake drum in unclamped position;

FIGURE 5 is a transverse section taken substantially on the line 5—5 of FIGURE 1 and showing the spider of the clamping device; and FIGURE 6 is a fragmentary cross-sectional view, like a portion of FIG. 1, showing one of the clamping pins in non-clamping position.

Figure 4:
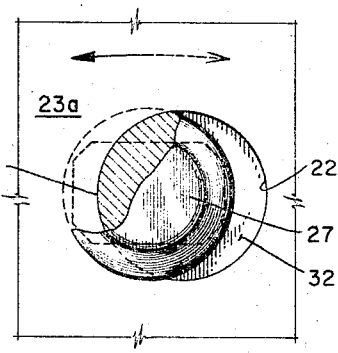
FIGURE 4 is an end view of one of the clamping pins taken in the direction of the arrows 4—4 in FIG. 1 and showing a portion of the pin broken away to show a portion of the brake drum head in clamped position.

For the purposes of illustration, the machine tool includes a rotatable mandrel 1 having a coaxial bore 2 and a counterbore 3 extending inwardly from its flat end face 4, and a pilot pin 5 longitudinally slidable in the bore 2, but fixed by means of a key 6 to rotate with the mandrel 1, the pilot pin having a coaxial, threaded counterbore 7 in its end, as shown in FIGURE 1.

The clamping device of the present invention includes a spider 8 (FIGURES 3 and 5) movable in a direction longitudinally of mandrel 1, and having radial arms 9, the ends of which are provided with rectangularly shaped slots 10.

The spider 8 has an axial bore 11 and floats on a sleeve 12 extending through the bore 11, the sleeve 12 having a head 13 at one end. The sleeve 12 is coaxially aligned with a second sleeve 14 having a head 15 abutting against the non-shouldered end of the sleeve 12 with the spider 8 disposed on sleeve 12 to slidingly float between the two heads 13 and 15.

The coaxial sleeves 12 and 14 have coaxial bores 16 and 17, respectively, and are secured in their coaxially aligned position to the pilot pin 5 by means of a bolt 18 threaded into the counterbore 7, as shown in FIGURE 1. As shown in FIGURE 6, the spider 8 and head 13 of sleeve 12 are provided with coaxial, spherical surfaces 19 and 19a, respectively, which coact with each other in the clamping position of the device to insure proper alignment.

The clamping device further includes a mounting head 20 having openings 21, the axes of which have the same spacing as the axes of the stud openings 22 in the head 23a of the brake drum 23 to be clamped in position for the machining operation. The head 20 is provided with longitudinally projecting portions 24 which extend between the radial arms 9 of the spider 8, but not in contact therewith, the ends of which abut the flat face 4 of the mandrel 1 and have portions 25 which interfit with the bore 3 of the mandrel 1 to provide a rigid structure. As shown in FIGURE 1, the head is rigidly secured to the mandrel 1 by headed bolts 26.

Mounted to slide longitudinally in the openings 21 of mounting head 20 with a close sliding fit are clamping pins 27. Each pin is cylindrical in shape at the end which is slidably guided in the opening 21 of the head 20 and is rectangular in shape at the opposite end. Each pin 27 is notched out on opposite sides as shown at 28 in FIGURE 3, and, at the notched out portions 28, fits within the rectangular slots 10 at the ends of a spider arm 9 in overlapping relation whereby sliding movement of the spider 8 slides the pin 27 in opening 21 of the mounting head 20. The square slots 10 in the arms 9 of the spider 8 and squared portions of the pins 27 prevent the pins from rotating with respect to the mounting head 20.

The clamping pins 27 are, of course, positioned within the slots 10 and held there while the head 20 is being assembled and secured to the mandrel 1.

Secured by cap screws 29 to the spider arms 9 are stop members 30, which, in the event the clamping pins 27 are actuated without a brake drum being in position for clamping, limit the movement of the spider 8 to the left as viewed in FIGURE 1.

Figure 2:
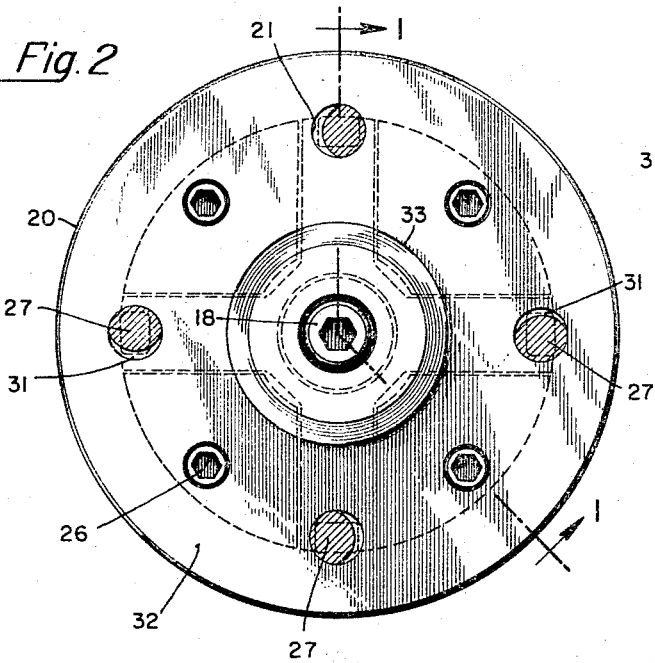
FIGURE 2 is a transverse view of the clamping device taken on the line 2—2 of FIGURE 1, but not showing the brake drum mounted thereon.
Figure 3:
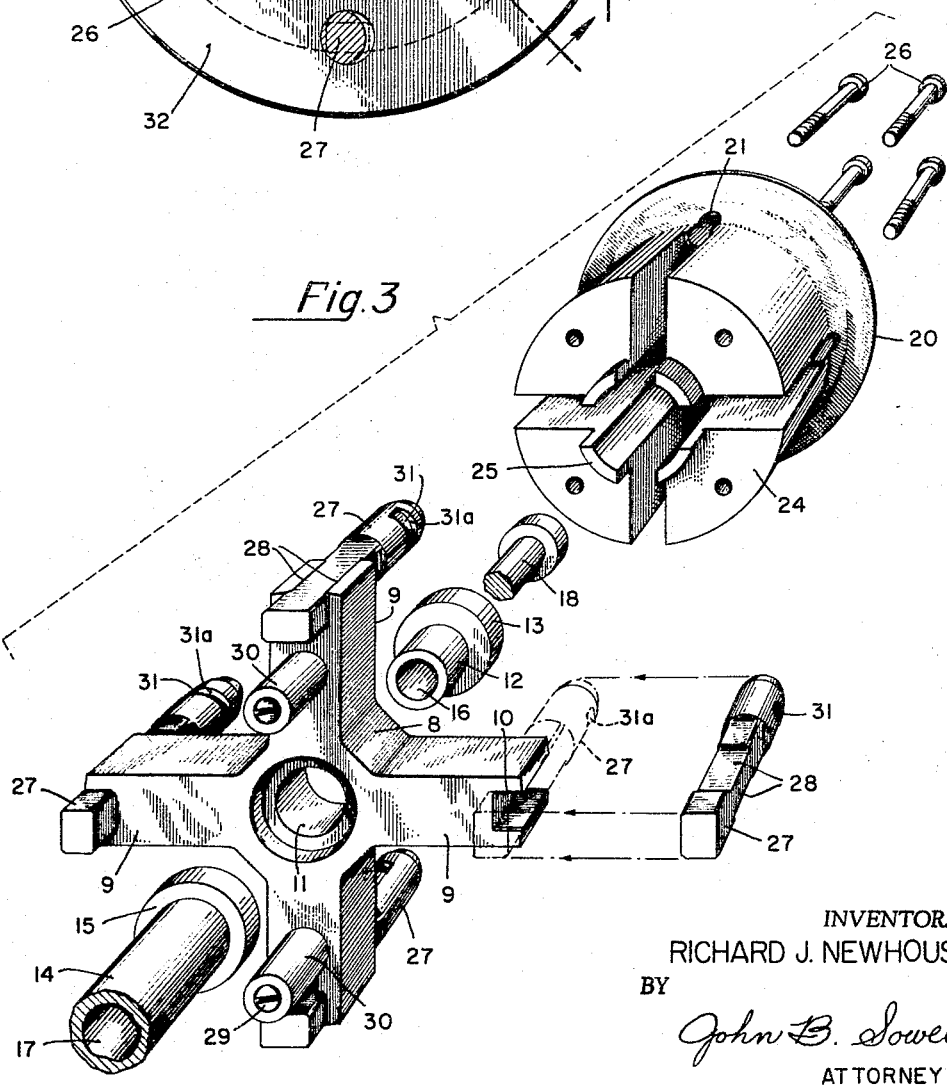
FIGURE 3 is a perspective view showing the various parts of the clamping device in exploded, non-assembled position.

As seen in FIGURES 2 and 3, the slidable clamping pins 27 are provided with transverse slots 31 which are disposed in part, at least, beyond the flat end face 32 of the mounting head 20 against which the head 23a of the brake drum 23 is positioned as shown in the non-clamping position in FIGURE 6. The outermost end face of each slot 31 provides a clamping shoulder 31a to be hereinafter described.

The clamping head 20 is provided with a coaxial, cylindrical hub portion 33 of a diameter which is only very slightly less than the diameter of the hub opening 34 of the brake drum 23. Similarly the diameters of the clamping pins 27 are such that they will have only a minimum clearance with the brake drum stud holes 22 when the brake drum is mounted in position to be clamped.

In the operation of the device above described, the operator of the machine tool, with the clamping device in non-clamping position, as viewed in FIGURE 6, and with the device in non-rotating position, places the brake drum to be machined over the cylindrical hub portion 33 of the mounting head 20 and with the clamping pins 27 projecting through the stud holes 22 and with the brake drum head or web 23a aligned with the slots 31 of the clamping pins 27. He then rotates the drum to the right as viewed in FIGURE 4 so that portions of the brake drum head are disposed within the confines of the slots 31 of the clamping pins 27. Upon the actuation of the mechanism (not shown) for actuating the pilot pin 5 through the spider 8 and interconnecting parts of the left as viewed in FIGURE 1, the clamping pins 27 are moved to the left as viewed in FIGURE 1 to clamp the brake drum in position by mean of the engagement of the outermost shoulder 31a of the slots 31 with the metal of the brake drum head. This is the position as shown in FIGURE 1 and FIGURE 4. The machine tool is then actuated to rotate the mandrel 1 for the performance of the machining operation. For the purpose of illustration honing devices 35 are shown in broken outline in FIGURE 1. However, the clamping device may be stationary and the honing devices rotated, if desired.

Upon completion of the machining operation, rotation of the mandrel is terminated and the pilot pins 5 are actuated to the right as viewed in FIGURE 1 by the spider 8, whereby the operator merely rotates the brake drum to the left as viewed in FIGURE 4 to disengage the drum head from the shoulders 31a of the slots 31 and moves the brake drum out of engagement with the clamping pins 27.

Thus the loading and unloading of the brake drums with respect to the machine tool can be done easily and rapidly with the insurance that the drum will be accurately centered, especially since in brake drums and the like the stud openings are controlling so far as concentricity is concerned.

It is to be noted also that the clamping device is comprised of relatively few parts.

It is to be understood, of course, that the brake drum was merely selected for the purpose of illustration and that the clamping device of the present invention is applicable for use with any article having stud or other openings located in a single radial plane.

While there has been shown and described a particular embodiment of the invention, it will be obvious to those skilled in the art that change and modifications may be made without departing from the invention, and that it is intended by the appended claims to cover all such changes and modifications as fall within the true spirit and scope of the invention.

What I claim is:

1. Means for clamping and holding a workpiece having a web and a plurality of apertures extending therethrough, the apertures having parallel axes and including a central pilot aperture at the axis of rotation which is generally concentric with the axis and a plurality of locational apertures arranged in a circle around the axis and which is accurately concentric with the axis of rotation, said means comprising:

(a) a mounting head having a workpiece clamping face and open-ended apertures therein corresponding in number and spacing to the locational apertures in the workpiece, said mounting head apertures having parallel axes, (b) clamping pins mounted within said mounting head apertures with a close sliding fit and having end portions which extend beyond said clamping face, said end portions of the clamping pins being of a size and location to accurately fit in the locational holes of the workpiece, said clamping pins having transverse slots of greater axial width than the portions of the web adjacent the workpiece apertures, each of said slots having a clamping shoulder engageable with the workpiece web when the workpiece is positioned with its web against said clamping face, with said clamping pins extending through said workpiece apertures and with portions of the workpiece web disposed within said slots, all of the slots in said clamping pins facing in the same direction along a circle concentric with the axis of rotation whereby to engage the workpiece web in said slots by relative rotation around the turning axis; and (c) means for axially moving said clamping pins simultaneously in a direction to engage said clamping shoulders with the workpiece web and clamp the workpiece web against said clamping face, and to move said clamping pins in the opposite direction to release said clamping shoulders from clamping engagement with said web.

2. The clamping means of claim 1 in which the means last named therein comprises an element at the side of said mounting head opposite said mounting face, said element being movable toward and away from said mounting head, said element having notches in the periphery thereof rectangular-shaped in cross-section and being of the same spacing as said clamping pins, and each of said clamping pins at the end opposite the slotted end thereof being recessed at opposite sides, said opposite sides being substantially parallel, each said pin being disposed within a notch of said element with the ends of the recessed portions overlapping the sides of said element, whereby movement of said element axially moves said clamping pins.

3. The clamping means as set forth in claim 1, wherein said mounting head is provided with a central front projection extending beyond the end of said clamping pins and fitting relatively closely the pilot aperture in the workpiece to facilitate rotation for alining said locational apertures with said clamping pins and subsequent relative rotation to engage the web aperture edges in said pin slots, and the outer ends of said clamping pins being tapered to facilitate entry into said locational apertures.

References Cited
UNITED STATES PATENTS

| 1,691,657 | 11/1928 | Kempton | 279—1 |
| 2,890,053 | 6/1959 | Walker | 279—1 |

FOREIGN PATENTS 603,890  6/1948  Great Britain.

ROBERT C. RIORDON, *Primary Examiner.*

H. V. STAHUTH, *Examiner.*